(12) United States Patent
Jiang (10) Patent No.: US 10,439,937 B2
(45) Date of Patent: Oct. 8, 2019

(54) SERVICE ADDRESSING IN DISTRIBUTED ENVIRONMENT

(71) Applicant: Alibaba Group Holding Limited, Grand Cayman (KY)

(72) Inventor: Tao Jiang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 37 days.

(21) Appl. No.: 14/945,137

(22) Filed: Nov. 18, 2015

(65) Prior Publication Data

US 2016/0142369 A1 May 19, 2016

(30) Foreign Application Priority Data

Nov. 18, 2014 (CN) .......................... 2014 1 0659256

(51) Int. Cl.
*H04L 12/741* (2013.01)
*H04L 29/12* (2006.01)
*H04L 29/14* (2006.01)

(52) U.S. Cl.
CPC ........ H04L 45/745 (2013.01); H04L 61/1541 (2013.01); H04L 69/40 (2013.01)

(58) Field of Classification Search
CPC .... H04L 45/745; H04L 61/1541; H04L 69/40
See application file for complete search history.

(56) References Cited

U.S. PATENT DOCUMENTS

| 6,173,322 | B1 | 1/2001 | Hu | |
|---|---|---|---|---|
| 6,298,451 | B1 * | 10/2001 | Lin | ....................... G06F 9/5055 714/2 |
| 6,665,824 | B1 | 12/2003 | Ruhlen et al. | |
| 7,990,847 | B1 * | 8/2011 | Leroy | ..................... H04L 69/40 709/227 |
| 9,176,784 | B2 * | 11/2015 | Kakadia | .............. H04L 67/1002 |
| 2005/0091217 | A1 * | 4/2005 | Schlangen | .............. H04L 69/40 707/999.01 |

(Continued)

FOREIGN PATENT DOCUMENTS

| EP | 0384339 A2 * | 8/1990 | ........... G06F 9/5044 |
|---|---|---|---|
| JP | H09319689 A | 12/1997 | |

(Continued)

OTHER PUBLICATIONS

PCT Search Report and Written Opinion dated Feb. 5, 2016 for PCT Application No. PCT/US15/61392, 9 pages.

(Continued)

*Primary Examiner* — Nam T Tran (74) *Attorney, Agent, or Firm* — Lee & Hayes, P.C.

(57) ABSTRACT

An example service addressing method in a distributed environment includes: generating a service querying request, the service querying request including a querying condition; acquiring a first server address list of a target service corresponding to the querying condition; acquiring a failed server address list; deleting the failed server address list from the first server address list to obtain a second server address list; selecting a target server address from the second server address list; and initiating an invocation of the target service to the target server address. The techniques of the present disclosure improve the efficiency of the service invocation.

20 Claims, 4 Drawing Sheets

(56) References Cited

U.S. PATENT DOCUMENTS

| | | | |
|---|---|---|---|
| 2006/0168334 A1* | 7/2006 | Potti | H04L 69/40 709/227 |
| 2006/0242318 A1 | 10/2006 | Nettle et al. | |
| 2008/0316931 A1* | 12/2008 | Qiu | H04L 69/40 370/245 |
| 2010/0153524 A1 | 6/2010 | Rehm et al. | |
| 2010/0223364 A1 | 9/2010 | Wei | |
| 2012/0159233 A1 | 6/2012 | Hoeflin et al. | |
| 2013/0066960 A1 | 3/2013 | Fieremans et al. | |
| 2013/0205011 A1 | 8/2013 | Toumura et al. | |
| 2013/0223605 A1 | 8/2013 | Statham et al. | |
| 2014/0022936 A1 | 1/2014 | Robitaille et al. | |

FOREIGN PATENT DOCUMENTS

| | | |
|---|---|---|
| JP | 2007257481 A | 10/2007 |
| WO | WO0133687 A1 | 5/2018 |

OTHER PUBLICATIONS

The Extended European Search Report dated Mar. 29, 2018 for European patent application No. 15861816.5, 6 pages.

First Chinese Office Action for Application No. 201410659256.3, a counterpart foreign application of U.S. Appl. No. 14/945,137, dated Apr. 26, 2018, 5 pages.

Chinese Search Report for Application No. 2014106592563, dated Apr. 16, 2014, 1 page.

The European Office Action dated Feb. 1, 2019 for European Patent Application No. 15861816.5, a counterpart of U.S. Appl. No. 14/945,137, 7 pages.

Translation of second Chinese Office Action for Application No. 201410659256.3, a counterpart foreign application of U.S. Appl. No. 14/945,137, dated Jul. 9, 2018, 10 pages.

Translation of third Chinese Office Action for Application No. 201410659256.3, a counterpart foreign application of U.S. Appl. No. 14/945,137, dated Dec. 29, 2018, 10 pages.

The Japanese Office Action dated Mar. 19, 2019 for Japanese Patent Application No. 2017-522867, a counterpart of U.S. Appl. No. 14/945,137, 6 pages.

* cited by examiner

SERVICE ADDRESSING IN DISTRIBUTED ENVIRONMENT

CROSS REFERENCE TO RELATED PATENT APPLICATION

This application claims foreign priority to Chinese Patent Application No. 201410659256.3 filed on 18 Nov. 2014, entitled "Method and Apparatus for Service Addressing under Distributed Environment", which is hereby incorporated by reference in its entirety.

TECHNICAL FIELD

The present disclosure relates to the technical field of data addressing, and, more particularly, to a service addressing method in a distributed environment and a service addressing apparatus in a distributed environment.

BACKGROUND

With the development of the information industry, different kinds of operating systems, application software, system software, and application infrastructures blend more and more with each other, thereby generating a Service-Oriented Architecture (SOA) technology which is widely used.

The SOA is a component model, which associates different functional units (referred to as services) of the application with each other through well-defined interfaces and contracts between these services. An application providing services to the outside is referred to as a service provider, and an application using the services provided by other applications is referred to as a service consumer. In a distributed environment, there is a large number of service consumers and service providers, such that some customer-oriented online shopping malls own thousands of service providers and even a larger number of service consumers, and in such cases, a cluster environment is formed.

With the continuous increase of services in the system, the dependencies of the services in the whole system gradually render a complex network chart phenomena, and in this case, the demand for a unified service addressing site becomes very apparent, thereby resulting in a service registration center. Usually, the service provider needs to uniformly register the service address information provided by the service provider, as well as the name, interface, attribute, and other meta-information to the service registration center. Then the service registration center provides the service information of each service provider to the service consumer in the form of a list or other forms, so that the service consumer may find the desired service provider according to this list of service information, thereby requesting the service provider to provide corresponding services.

However, in the cluster environment, there may be more than one target service address obtained by the service consumer via the service registration center, and when a certain server fails and cannot provide services normally, the requests falling within these servers will be executed unsuccessfully. In the case of a high concurrency, if the service consumer cannot identify the failed server and take effective isolation means in a timely manner, many service invocation failures will occur, thereby affecting availability of the system. With the increasing scale of the cluster and the larger failure that appears, there are more needs for an effective isolation method with respect to failures.

Currently, the service addressing strategies supporting the failure isolation functions mainly include:

a load-based addressing strategy to select a server with a lower load; however, such an addressing strategy needs to sense the load condition on the side of the service provider each time when the service invocation is performed, so as to increase the burden of the service provider on the real-time monitoring on the load thereof, and require the service consumer to acquire the load data in real time, thereby occupying a large amount of computing and network transmission resources;

a concurrency-based addressing strategy to select a server with a lower concurrency; however, such an addressing strategy requires the service consumer to perform real-time statistics on the concurrent invocation amount of each service provider each time when the service invocation is performed, which also requires a large amount of computing; and a weight-based addressing strategy to select a server with a higher (or less, depending on the specific algorithm) weight serve, which is an integrated approach and calculates the weight according to a certain formula, and also requires computing for each invocation.

The above addressing strategies for each service invocation all require performing corresponding information collection and computing, thereby having a high cost in computing especially during a high concurrency and a large number of invoked services and addresses of the service providers. In the environment of a relatively high success rate of invocation, many computing processes are not necessary.

Therefore, the technical problem, which is currently an urgent need for those skilled in the art to resolve, is to provide a service addressing mechanism in a distributed environment to improve the efficiency of the service invocation.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The technical problem to be solved by the techniques of the present disclosure is to provide a service addressing method in a distributed environment, for improving the efficiency of the service invocation.

Accordingly, the present disclosure further provides a service addressing apparatus in a distributed environment to ensure the implementation and application of the above method.

In order to solve the above problems, the present disclosure discloses a service addressing method in a distributed environment, which includes the following operations:

generating a service querying request, the service querying request including a querying condition;

acquiring a first server address list of a target service corresponding to the querying condition;

acquiring a failed server address list;

deleting the failed server address list from the first server address list to obtain a second server address list;

selecting a target server address from the second server address list; and initiating an invocation of the target service to the target server address.

For example, before acquiring the failed server address list, the method further includes presetting a failure database, the failure database storing an association relationship between one or more failed server addresses and corresponding statistical numbers of failure times.

For example, the operation of acquiring the failed server address list includes:

acquiring failed server addresses matching the first server address list from the failure database;

if more than one failed server address is matched, sorting the more than one failed server address in accordance with the statistical numbers of failure times; and organizing a preset number of failed server addresses that have top rankings in the sorting into a failed server address list.

For example, the method further includes:

if the invocation of the target service fails, determining the target server address as a failed server address;

determining whether the failed server address exists in the failure database;

if a result of the determining is positive, increasing the statistical number of failure times corresponding to the failed server address by a preset threshold;

if the result of the determining is negative, adding the failed server address into the failure database, and setting the corresponding statistical number of failure times at a preset initial value;

updating the failed server address list; and with respect to the updated failed server address list, returning to the operation of deleting the failed server address list in the first server address list to obtain a second server address list.

For example, the cases of invocation failure of the target service include at least one of the following: response timeout and busy target server thread pool such that a busy degree of the target server thread pool is beyond a preset threshold.

For example, the method further includes:

respectively setting a timer for each of the failed server addresses in the failure database; and when the timer expires, resetting the statistical number of failure times corresponding to the corresponding failed server address to zero.

For example, the operation of acquiring the failed server address list includes:

generating a failure information acquiring request, wherein the failure information acquiring request is used to acquire information on a server that has ever been failed in a cluster within a preset time period;

sending the failure information acquiring request to a remote server, wherein the remote server keeps records of address information of the failed servers that have ever been failed in the cluster; and receiving the failed server address list returned by the remote server with respect to the failure information acquiring request.

For example, the operation of selecting a target server address from the second server address list includes randomly selecting the target server address from the second server address list.

The present disclosure further provides a service addressing apparatus in a distributed environment, which includes:

a request generating module that generates a service querying request, the service querying request comprising a querying condition;

a first address acquiring module that acquires a first server address list of a target service corresponding to the querying condition;

a failure address acquiring module that acquires a failed server address list;

a second address acquiring module that deletes the failed server address list in the first server address list to obtain a second server address list;

an address selecting module that selects a target server address from the second server address list; and a service invoking module that initiates an invocation of the target service to the target server address.

For example, the apparatus further includes a database presetting module that presets a failure database, the failure database storing an association relationship between one or more failed server addresses and corresponding statistical numbers of failure times.

For example, the failure address acquiring module includes:

an address matching sub-module that acquires failed server addresses matching the first server address list from the failure database;

an address sorting sub-module that, if more than one failed server address is matched, sorts the more than one failed server address in accordance with the statistical numbers of failure times; and a list organizing sub-module that organizes a preset number of failed server addresses that have top rankings in the sorting into a failed server address list.

For example, the apparatus further includes:

a determining module that, if the invocation of the target service fails, determines the target server address as a failed server address;

a judging module that judges whether the failed server address exists in the failure database;

a first calculating module that, when the judging module determines that the failed server address exists in the failure database, increases the statistical number of failure times corresponding to the failed server address by a preset threshold;

a second calculating module that, when the judging module determines that the failed server address does not exist in the failure database, adds the failed server address into the failure database, and sets the corresponding statistical number of failure times at a preset initial value;

a list updating module that updates the failed server address list;

a triggering module that triggers execution of the second address acquiring module with respect to the updated failed server address list.

For example, the cases of invocation failure of the target service include at least one of the following: response timeout and busy target server thread pool.

For example, the apparatus further includes:

a timer module that respectively sets a timer for each of the failed server addresses in the failure database;

a zero-resetting module that, when the timer expires, resets the statistical number of failure times corresponding to the corresponding failed server address to zero.

For example, the failure address acquiring module includes:

a failure request generating sub-module that generates a failure information acquiring request, wherein the failure information acquiring request is used to acquire information of a server that has ever been failed in a cluster within a preset time period;

a failure request sending sub-module that sends the failure information acquiring request to a remote server, wherein the remote server stores records of address information of the failed servers that have ever been failed in the cluster; and a failure information receiving sub-module that receives the failed server address list returned by the remote server with respect to the failure information acquiring request.

For example, the address selecting module includes a random selecting sub-module that randomly selects a target server address from the second server address list.

As compared with the conventional techniques, the techniques of the present disclosure have at least the following advantages.

The techniques of the present disclosure provide an addressing strategy based on invocation failure times statistics in a large scale of highly concurrent distributed service invocation scenario, which, during addressing, deletes the failed server address list having more recent invocation failure times from the currently obtained first server address list, to obtain the second server address list, and then randomly selects the target server address for the invocation of the target service from the second server address list. Such an addressing strategy that performs the statistic analysis only with respect to the cases of the invocation failure avoids excessive real-time calculations for each service invocation and achieves highly efficient service addressing, thereby achieving efficient local failure isolation in the cluster at a low cost.

DETAILED DESCRIPTION

In order to make the above objectives, features, and advantages of the present disclosure more apparent and comprehensible, the present disclosure is further described in detail below with reference to the accompanying drawings and example embodiments.

Figure 1:
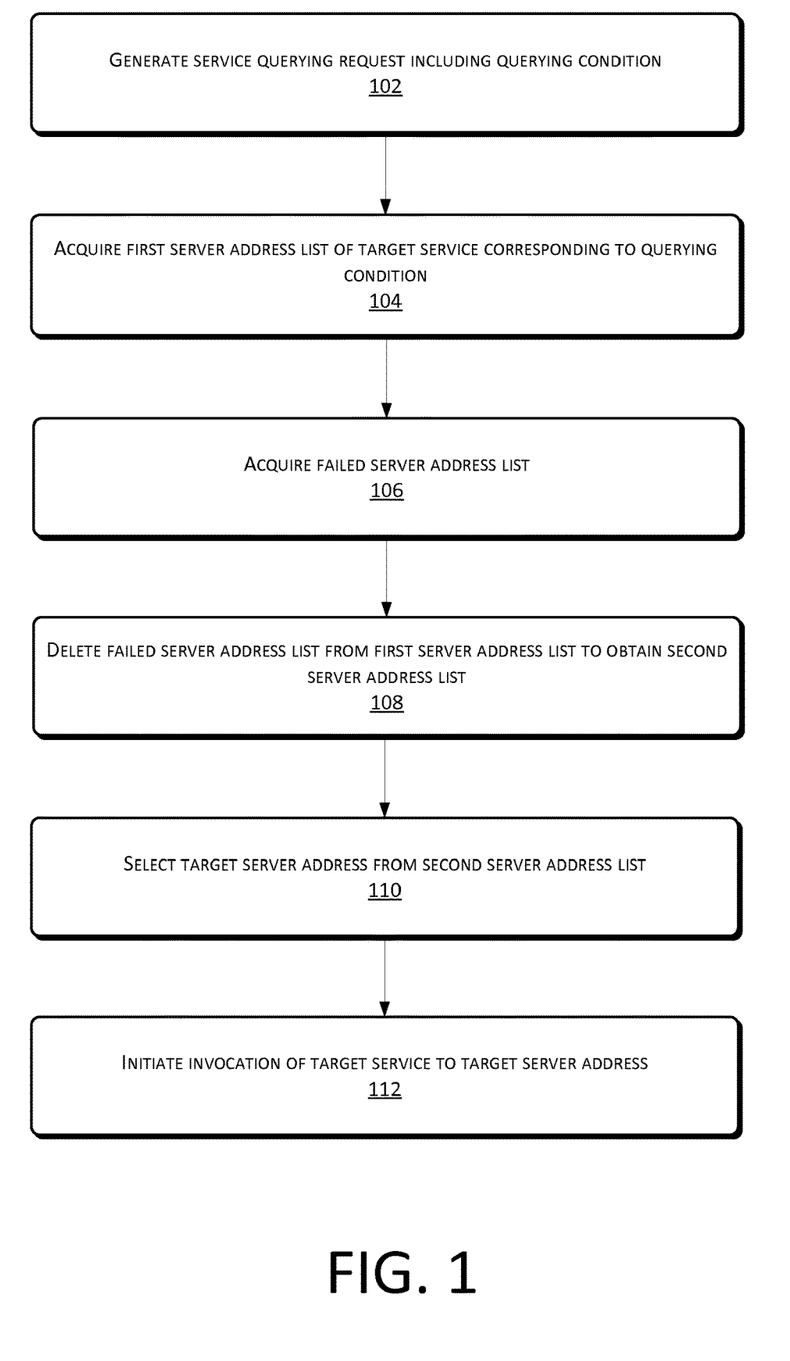
FIG. 1 is a flowchart of an example service addressing method in a distributed environment according to a first example embodiment of the present disclosure.

FIG. 1 illustrates a flowchart of an example service addressing method in a distributed environment according to a first example embodiment of the present disclosure, which may include the following operations.

At 102, a service querying request is generated. The service querying request includes a querying condition.

For example, the example embodiment of the present disclosure is used in a SOA architecture. After a service provider releases a service description at a service registration center, the service registration center makes a registration. A service consumer searches for the service description released at the service registration center. For instance, the service consumer generates a service querying request containing a querying condition to search for the required service, and sends the service querying request to the service registration center. Herein, the querying condition may include types of services, quality guarantees of services, security verification, and so on.

At 104, a first server address list of a target service corresponding to the querying condition is acquired.

After receiving the service querying request, the service registration center searches in the released service description according to the querying condition to find a target service matching the querying condition.

In a cluster environment, more than one service address provide the target services, so that the service registration center presents the server addresses that provide the target service in the form of a list (i.e., the first server address list) to the service consumer.

For example, the first server address list includes a server address identifier (i.e., an access path of the service), parameters of service invocation, transfer protocols, security requirements, and so on.

At 106, a failed server address list is acquired.

The failed server address has a corresponding statistical number of failure times, wherein the statistical number of failure times is used to make statistics on the number of failure times of the corresponding failed server within a preset period. Thus, the failed server address list, after the failed server addresses are identified from the first server address list, includes the list composed of a preset number of failed server addresses that have top rankings in the sorting in the statistical number of failure times.

For example, before the operations at 106, the method may further include presetting a failure database, the failure database storing an association relationship between one or more failed server addresses and corresponding statistical numbers of failure times.

The failure database may be set in a memory of the service consumer, store information of a failed server and make statistics on a statistical number of failures of the failed server. The failed server is a server failed in service invocation (i.e., the service provider). The invocation failures may be at least one of the following circumstances: invocation timeout, exception thrown by the server side, busy thread pool of the server side, abnormal communication layer, rejection of execution of the server side, and so on. When the server has the slow type of failures such as being halted, the common failure reasons include invocation timeout, busy thread pool of the server side, and so on. For instance, if the exception thrown by the server is caused by the underlying storage which the server relies on, rather than a problem with the server itself, the invocation failures in such a circumstance do not belong to the category of server failures.

For example, the form that the failure database stores the statistical number of the failed server and failure times as a data record may be a corresponding relationship between the failed server address identifier and the statistical number of failure times, such as <192.168.0.1:15>, in which 192.168.0.1 is the failed server address identifier and 15 is the statistical number of failure times.

For example, when one failed server is added into the failure database for the first time, the statistical number of failure times may be a preset initial value, and the preset initial value may be 1 or other numerical values.

For example, the operations at 106 may include the following sub-operations.

At a first sub-operation, the failed server addresses matching the first server address list is acquired from the failure database.

After the first server address list is acquired, the failed server addresses matching the first server address list are acquired from the failure database. For example, each data record in the failure database is traversed through the first server address list. If the data record is found in the first server address list, it indicates that the data record matches with the data in the first server address list, and the above process is repeated until all the failed server addresses matching the first server address list are found. The number of the found failed server addresses may be 0, 1, or more.

At a second sub-operation, if more than one failed server address is matched, the more than one failed server address is sorted in accordance with the statistical numbers of failure times.

When more than one failed server address is matched, the more than one failed server address is sorted according to the statistical number of failure times corresponding to each failed server address, and is sorted in an ascending order or a descending order according to the statistical number of failure times. For example, the failed server addresses are sorted in a descending order such as: [<192.168.0.1:15>, <192.168.0.3:13>, . . . , <192.168.0.18:3>, . . . , <192.168.0.111:1>].

At a third sub-operation, a preset number of failed server addresses that have top rankings in the sorting is organized into a failed server address list.

If the descending order is used, a preset number of failed server addresses that have top rankings at the head of queue in the sorting is obtained to be organized into the failed server address list (which may be marked as unstableUrls). Correspondingly, in the ascending order, a preset number of failed server addresses that have top rankings in the tail of queue in the sorting is obtained to be organized into the failed server address list. Herein, in order to avoid isolating too many failed servers in some exception cases thereby causing that the remaining servers burst, the man function of the preset number is to represent how many failed server is to be isolated at most, which may be a threshold set as demanded. For example, since the design and implementation of services will guarantee target availability, and the availability is always required to be above 99.99% in a large scale of commercial SOA, in such a system, most of the service invocations are successfully achieved, and fewer servers are failed. A single computer may be failed more possibly. So the preset number may be 1, 2, or other small number. For example, with respect to the aforementioned example, if the preset number is 2, the unstableUrls is [192.168.0.1 and 192.168.0.3]; and if the preset number is 1, the unstableUrls is [192.168.0.1].

At 108, the failed server address list is deleted in the first server address list to obtain a second server address list.

When the failed server address list is acquired, the failed server address list is filtered in the first server address list, i.e., the addresses of the failed server address list is deleted from the first server address list, and the remaining server addresses are listed as a second server address list for isolating the failed server.

At 110, a target server address is selected from the second server address list.

For example, the failed server address are identified and isolated from the second server address list and the servers that provide services are usually in a unified specification. That is, in a cluster, each server has an essentially equal service capability as each other. Therefore, a random addressing strategy that selects the target server address randomly in the second server address list may be used, which needs not to perform any deliberate calculation and selection, thereby simplifying the addressing process, and at the same time, the decreased amount of data in calculation reduces the data processing pressure of the server (the service provider and the service consumer), so that the efficiency of addressing is improved.

At 112, an invocation of the target service is initiated to the target server address.

After a target server is selected, the invocation of the target service may be initiated to the target server address. At this point, if the target server fails in the invocation of the service, the target server address is determined as the failed server address. Then whether the failed server address exists in the failure database is further determined; if a result of the determining is yes, the statistical number of failure times corresponding to the failed server address is increased by a preset threshold; and if not, the failed server address is added into the failure database, and a corresponding statistical number of failure times is set at a preset initial value. Herein, the preset threshold may be a preset increase margin (for example, increasing a preset number of times or increasing by 1, and so on). For example, the service invocation failure data in the original failure database is [<192.168.0.1:9>, <192.168.0.3:6>], and the invocation of 192.168.0.3 fails, so that, in combination, the service invocation failure data is changed into [<192.168.0.1:9>, <192.168.0.3:7>].

Due to the change of the statistical number of failure times in the failure database, which may affect the sorting of the failed servers in the failure database, the failed server address list needs to be updated according to the sorting result. With respect to the updated failed server address list, the method returns to the operation at 108 to select the target server by retrying and perform the invocation of the target service on the target server, repeat the process of updating the above failed server address list and re-selecting the target server until the invocation of the target service succeeds. The example embodiment of the present disclosure selects the target server in a manner of allowing the service consumer to retry, thereby enhancing the success rate of the service invocation.

In addition, in the example embodiment of the present disclosure, a timer may be set for each data record in the failure database, i.e., each failed server address, and when the timer expires, the statistical number of failure times corresponding to the corresponding failed server address is reset to zero. By resetting the statistical number of failure times of the failed server address to zero periodically, after the service capability of the failed server is restored, the server address is normally invoked.

The example embodiment of the present disclosure provides an addressing strategy based on invocation failure times statistics in a large scale of highly concurrent distributed service invocation scenario, which, during addressing, deletes the failed server address list having more recent invocation failure times from the currently obtained first server address list to obtain the second server address list, and then randomly selects the target server address for the invocation of the target service from the second server address list. Such an addressing strategy that performs the statistic analysis only with respect to the case of the invocation failure avoids excessive real-time calculations for each service invocation and achieves highly efficient service addressing, thereby achieving efficient regional or local failure isolation in the cluster at a low cost.

Figure 2:
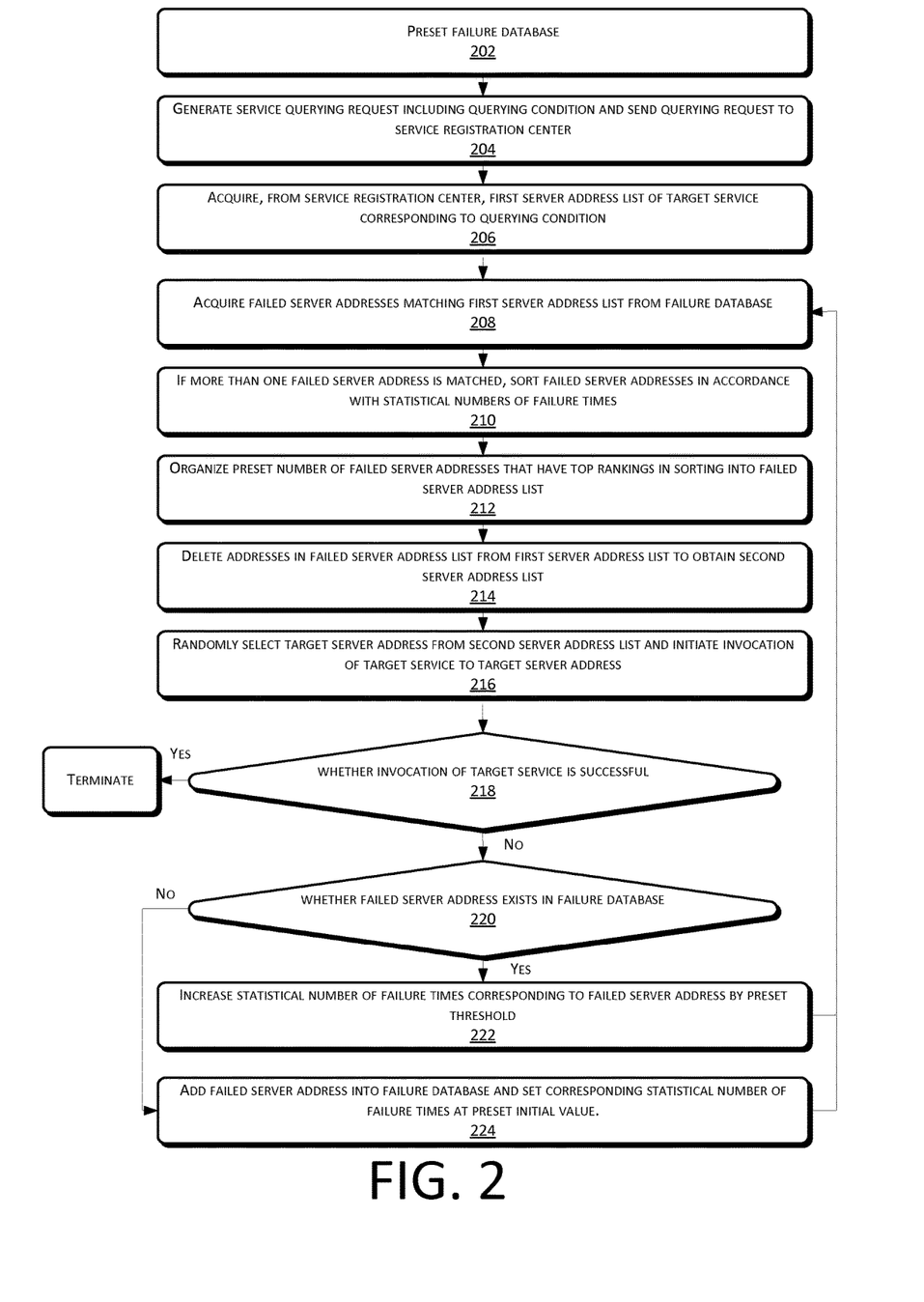
FIG. 2 is a flowchart of an example service addressing method in a distributed environment according to a second example embodiment of the present disclosure.

FIG. 2 shows a flowchart of an example service addressing method in a distributed environment according to a second example embodiment of the present disclosure, which may include the following operations.

At 202, a service consumer presets a failure database.

Herein, the failure database stores an association relationship between one or more failed server addresses and corresponding statistical numbers of failure times.

In the failure database, a timer is set for each failed server address to periodically reset the statistical number of failure times in the failed server, so that the failed server is normally invoked when being restored to normal.

At 204, the service consumer generates a service querying request, and sends the querying request to a service registration center. The service querying request includes a querying condition.

Herein, the querying condition may be types of services, quality guarantees of services, security verification, and so on.

At 206, the service consumer acquires, from the service registration center, a first server address list of a target service corresponding to the querying condition.

At 208, the service consumer acquires failed server addresses matching the first server address list from the failure database.

At 210, if more than one failed server address is matched, the more than one failed server address is sorted in accordance with the statistical numbers of failure times.

At 212, the service consumer organizes a preset number of failed server addresses that have top rankings in the sorting into a failed server address list.

At 214, the service consumer deletes addresses in the failed server address list from the first server address list to obtain a second server address list.

At 216, the service consumer randomly selects a target server address from the second server address list, and initiates an invocation of the target service to the target server address.

At 218, the service consumer determines whether the invocation of the target service is successful; and if a result of determining is yes, terminates the process, or if the result is no, performs the operations at 220.

At 220, the service consumer judges whether the failed server address exists in the failure database; and if a result of judging is yes, performs the operations at 222, or if the result is no, performs the operations at 224.

At 222, the statistical number of failure times corresponding to the failed server address is increased by a preset threshold, and the method returns to proceed with the operation at 208.

At 224, the failed server address is added into the failure database, and the corresponding statistical number of failure times is set as a preset initial value, and the method returns to proceed with the operation at 208.

The example method embodiment shown in FIG. 2, which is somewhat similar to the method embodiment shown in FIG. 1, is simply described, and the related portion thereof may refer to the description in the portion of the first example method embodiment.

Figure 3:
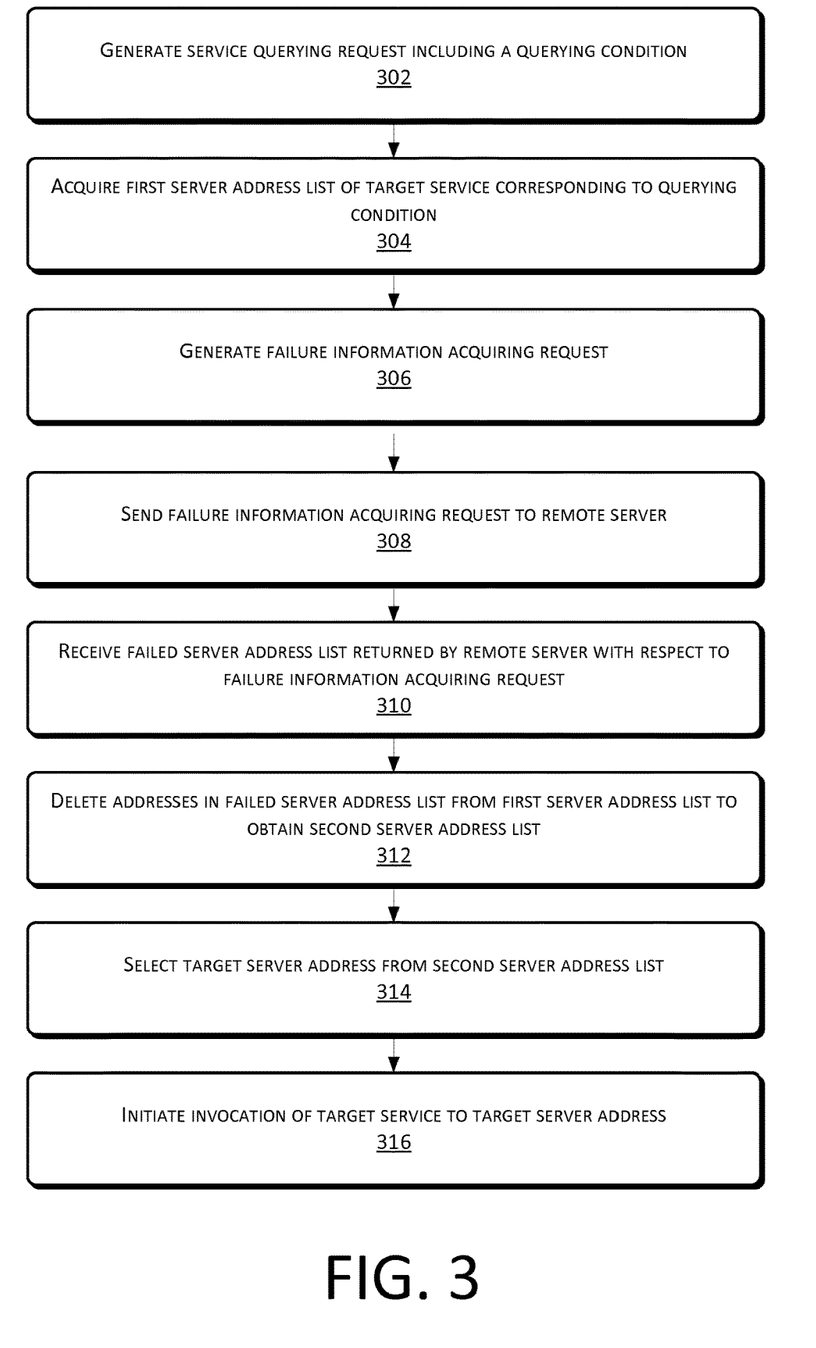
FIG. 3 is a flowchart of an example service addressing method in a distributed environment according to a third example embodiment of the present disclosure.

FIG. 3 shows a flowchart of an example service addressing method in a distributed environment according to a third example embodiment of the present disclosure, which may include the following operations.

At 302, a service querying request is generated. The service querying request includes a querying condition.

The service consumer may generate a service querying request containing a querying condition to search for the desired service, and send the service querying request to the service registration center. Herein, the querying condition may include types of services, quality guarantees of services, security verification, and so on.

At 304, a first server address list of a target service corresponding to the querying condition is acquired.

The service consumer acquires, from the service registration center, a first server address list of a target service corresponding to the querying condition. For example, after receiving the service querying request, the service registration center searches in the released service description according to the querying condition to find a target service matching the querying condition.

In a cluster environment, more than one service address may provide the target services, so that the service registration center may present the server addresses that provide the target services in the form of a list (i.e., the first server address list) to the service consumer.

For example, the first server address list may include a server address identifier (i.e., an access path of the service), parameters of service invocation, transfer protocols, security requirements, and so on.

At 306, a failure information acquiring request is generated. The failure information acquiring request is used to acquire information on a server that has ever been failed in a cluster within a preset time period.

The service consumer generates a failure information acquiring request. The failure information acquiring request is used to acquire the information of a server that has been failed in the cluster within the preset time period, such as server address information, identifier information, path information, and so on. The failure information acquiring request includes a target service identifier.

Herein, the preset time period may be a time period set as demanded, such as one day, one week, and so on.

It should be noted that, the operations at 302 and 306 may be simultaneously or asynchronously performed. For example, the operation at 302 is first performed to obtain the first server address list before the operation at 306 is performed. The example embodiment of the present disclosure does not restrict the sequence of performing the operations at 302 and 306.

At 308, the failure information acquiring request is sent to a remote server. The remote server keeps records of address information of the failed servers that have been failed in the cluster.

At 310, the failed server address list returned by the remote server with respect to the failure information acquiring request is received.

After generating the failure information acquiring request, the service consumer may send the failure information acquiring request to a remote server, wherein, the remote server keeps records of address information of the failed servers that have been failed in the cluster. For example, when the service consumer fails in invoking a service to the service provider, the service consumer may send the invocation failure information such as a service provider address (i.e., the failed server address), an identifier of the invoked service, invocation time, failure causes (invocation timeout, exception thrown by the server side, busy thread pool of the server side, abnormal communication layer, rejection of execution of the server side, and so on) to a remote server. The remote server may then record the invocation failure information, make statistics on the statistical number of failure times of the failed server failing in the invocation, and generate an association relationship between the failed server address and the corresponding statistical number of failure times, such as <192.168.0.1:15>. For instance, at the remote server, a container may be set to calculate the statistical number of failure times for each failed server. Certainly, the invocation failure information may be provided by the service consumer to the remote server, and may also be provided by the service provider to the remote server actively, which needs not to be limited in the example embodiment of the present disclosure.

For example, when receiving invocation failure information, the remote server first searches for whether a failed server address corresponding to the invocation failure information is recorded locally. If not, the remote server records the invocation failure information and sets the statistical number of failure times at a preset initial value, the preset initial value being 1 or other numerical values. If the failed server address corresponding to the invocation failure information is recorded locally, the statistical number of failure times is increased by a preset threshold, for example, increased by 1.

In the remote server, if more than one failed server address is matched, the more than one failed server address may be sorted according to the statistical number of failure times, and sorted in an ascending order or a descending order according to the statistical number of failure times. For example, the failed server addresses may be sorted in a descending order such as: [<192.168.0.1:15>, <192.168.0.3:13>, . . . , <192.168.0.18:3>, . . . , <192.168.0.111:1>].

After receiving the failure information acquiring request, the remote server may organize the preset number of failed server addresses that have top rankings in the sorting into a failed server address list, and returns the failed server address list to the service consumer.

In addition, in the remote server, a timer may be set for each failed server address, and when the timer expires, the statistical number of failure times corresponding to the corresponding failed server address is reset to zero. By resetting the statistical number of failure times of the failed server address to zero periodically, after the service capability of the failed server is restored, the server address is normally invoked.

At 312, the addresses in the failed server address list is deleted from the first server address list to obtain a second server address list.

For example, after receiving the failed server address list, the service consumer matches each failed server address in the failed server address list with the first server address list. If the failed server address is found in the first server address list, the service consumer deletes the failed server address from the first server address list, and the above process is repeated until all the failed server addresses in the failed server address list are matched, so that the first server address list from which the failed server address is deleted is the second server address list.

At 314, a target server address is selected from the second server address list.

At 316, an invocation of the target service is initiated to the target server address.

This example embodiment of the present disclosure are different from the example embodiments in FIG. 1 or FIG. 2 in that, the embodiments in FIG. 1 and FIG. 2 are to maintain the failed server address at the service consumer locally, i.e., to obtain the failed server address list from the service consumer locally, while this example embodiment is to maintain the failed server address in the remote server, i.e., to obtain the failed server address list from the remote server. A benefit obtained by maintaining the failed server address in the remote server is to reduce the local storage pressure of the service consumer, enhance the data processing efficiency of the service consumer, and further improve the performance of the service consumer. On the other hand, the identified failed server may also be shared with all the service consumers, so as to avoid the troubles of maintaining the failed server address in every service consumer, thereby enhancing the efficiency of acquiring the failed server address list by the service consumer.

The example method embodiment shown in FIG. 3, which is somewhat similar to the example method embodiments shown in FIG. 1 and FIG. 2, is briefly described, and the related portion thereof may refer to the description in the portion of the other example method embodiments.

It should be noted that, the example method embodiments, for purpose of brevity, are expressed as a combination of a series of motions, but those skilled in the art should know that, the present disclosure is not limited by the sequence of the described motions as, according to the present disclosure, some operations may be executed in other sequences or at the same time. Next, those skilled in the art should also know that the embodiments described in the specification are examples, and some of the described actions are not necessary for the present disclosure.

Figure 4:
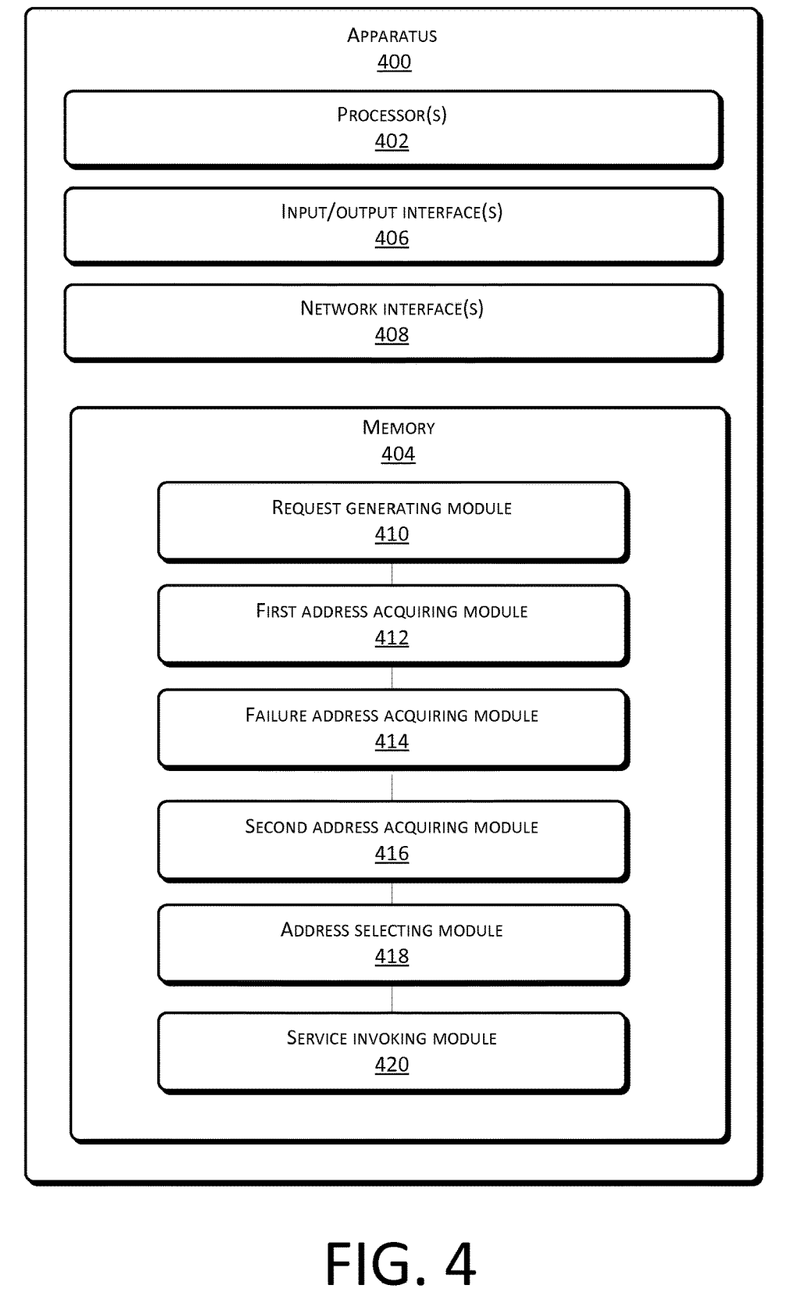
FIG. 4 is a structural diagram of an example service addressing apparatus in a distributed environment according to an example embodiment of the present disclosure.

FIG. 4 shows a structural diagram of an example service addressing apparatus 400 in a distributed environment according to the present disclosure.

As shown in FIG. 4, the apparatus 400 may include one or more processor(s) 402 or data processing unit(s) and memory 404. The apparatus 400 may further include one or more input/output interface(s) 406, and network interface(s) 408. The memory 404 is an example of computer-readable media.

The memory 404 may store therein a plurality of modules or units including:
  a request generating module 410 that generate a service querying request, the service querying request comprising a querying condition;
  a first address acquiring module 412 that acquires a first server address list of a target service corresponding to the querying condition;
  a failure address acquiring module 414 that acquires a failed server address list, wherein, the failed server address has a corresponding statistical number of failure times, the failed server address list is a list composed of a preset number of failed server addresses, identified from the first server address list, that have top rankings in the sorting of the statistical number of failure times;
  a second address acquiring module 416 that deletes addresses in the failed server address list from the first server address list to obtain a second server address list;
  an address selecting module 418 that selects a target server address from the second server address list; and
  a service invoking module 420 that initiates an invocation of the target service to the target server address.

For example, the apparatus of the embodiments of the present disclosure may further include a database presetting module (not shown in FIG. 4), stored on the memory, which presets a failure database. The failure database stores an association relationship between one or more failed server addresses and corresponding statistical numbers of failure times.

For example, the failure address acquiring module 414 may include the following sub-modules (not shown in FIG. 4) including:

an address matching sub-module that acquires failed server addresses matching the first server address list from the failure database;

an address sorting sub-module that, if more than one failed server address is matched, sorts the more than one failed server address in accordance with the statistical numbers of failure times; and a list organizing sub-module that organizes a preset number of failed server addresses that have top rankings in the sorting into a failed server address list.

For example, the apparatus may further include the following modules (not shown in FIG. 4) stored on memory, which includes:

a determining module that, if the invocation of the target service fails, determines the target server address as a failed server address;

a determining module, used to judge whether the failed server address exists in the failure database;

a judging module that judges whether the failed server address exists in the failure database;

a first calculating module that, when the judging module determines that the failed server address exists in the failure database, increases the statistical number of failure times corresponding to the failed server address by a preset threshold;

a second calculating module that, when the judging module determines that the failed server address does not exist in the failure database, adds the failed server address into the failure database, and sets the corresponding statistical number of failure times at a preset initial value;

a list updating module that updates the failed server address list; and a triggering module that triggers execution of the second address acquiring module with respect to the updated failed server address list.

For example, the cases of invocation failure of the target service include at least one of the following: response timeout and busy target server thread pool.

For example, the apparatus may further include the following modules (not shown in FIG. 4) stored on memory, which includes:

a timer module that respectively sets a timer for each of the failed server addresses in the failure database; and a zero-resetting module that, when the timer expires, resets the statistical number of failure times corresponding to the corresponding failed server address to zero.

For example, the failure address acquiring module 414 may include the following sub-modules (not shown in FIG. 4) including:

a failure request generating sub-module that generates a failure information acquiring request, wherein the failure information acquiring request is used to acquire information of a server that has ever been failed in a cluster within a preset time period;

a failure request sending sub-module that sends the failure information acquiring request to a remote server, wherein the remote server stores records of address information of the failed servers that have ever been failed in the cluster; and a failure information receiving sub-module that receives the failed server address list returned by the remote server with respect to the failure information acquiring request.

For example, the address selecting module 418 may include a random selecting sub-module (not shown) that randomly selects a target server address from the second server address list.

The example apparatus embodiment shown in FIG. 4, which performs actions or operations similar to those described in the aforementioned example method embodiments, is briefly described, and the related portion thereof may refer to the description in the corresponding portion of the example method embodiments.

Each example embodiment in the present disclosure is described in a progressive manner, and emphasizes its difference from the other example embodiments. The same or similar portions of the example embodiments may refer to each other.

One of ordinary skill in the art should understand that the embodiments of the present disclosure may be methods, systems, or the programming products of computers. Therefore, the present disclosure may be implemented by hardware, software, or in combination of both. In addition, the present disclosure may be in a form of one or more computer programs containing the computer-executable instructions which may be implemented in the computer-readable medium (including but not limited to disks, CD-ROM, optical disks, etc.).

In a standard configuration, a computing device, such as the server, the terminal or the near-field device, as described in the present disclosure may include one or more central processing units (CPU), one or more input/output interfaces, one or more network interfaces, and memory. The memory may include forms such as non-permanent memory, random access memory (RAM), and/or non-volatile memory such as read only memory (ROM) and flash random access memory (flash RAM) in the computer-readable media. The memory is an example of computer-readable media. The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

The present disclosure is described by referring to the flow charts and/or block diagrams of the method, device (system) and computer program of the embodiments of the present disclosure. It should be understood that each flow and/or block and the combination of the flow and/or block of the flowchart and/or block diagram may be implemented by computer-executable instructions. These computer-executable instructions may be provided to the general computers, specific computers, embedded processor or other programmable data processors to generate a machine, so that a device of implementing one or more flows of the flow chart and/or one or more blocks of the block diagram may be generated through the instructions operated by a computer or other programmable data processors.

These computer-executable instructions may also be stored in other computer-readable media which may instruct a computer or other programmable data processors to operate in a certain way, so that the instructions stored in the computer-readable storage generate a product containing the instruction device, wherein the instruction device implements the functions specified in one or more flows of the flow chart and/or one or more blocks of the block diagram.

These computer-executable instructions may also be loaded in a computer or other programmable data processors, so that the computer or other programmable data processors may operate a series of operation steps to generate the process implemented by a computer. Accordingly, the instructions operated in the computer or other programmable data processors may provide the steps for implementing the functions specified in one or more flows of the flow chart and/or one or more blocks of the block diagram.

Although the example embodiments of the present disclosure have been described, those skilled in the art, once learning the basic inventive concept, may make additional alternations and modifications on these example embodiments. Therefore, the attached claims are intended to be explained to include the example embodiments and all the alternations and modifications falling within the scope of the embodiments of the present disclosure.

Finally, it should be further noted that, in this article, the terms such as first and second are only used to distinguish an entity or an operation with another entity or operation, and does not necessarily require or imply that such a practical relationship or sequence exists in these entities or operations. Moreover, terms "comprise", "include" or any other variations thereof are intended to cover non-exclusive inclusion, so that processes, methods, objects or terminal devices that comprise a series of essentials not only comprise these essentials, but also comprise other essentials not explicitly listed, or further comprise essentials inherent in the processes, methods, objects or terminal devices. Without more restrictions, an essential defined by the wording of "comprising a . . . " does not preclude the further inclusion of other identical essentials in the processes, methods, objects or terminal devices that comprise this essential.

The above description provides a detailed introduction of a service addressing method and a service addressing apparatus in a distributed environment provided by the present disclosure. The present disclosure applies example examples to illustrate the principle and implementations of the present disclosure. The above example embodiments are illustrated to help understand the method of the present disclosure and its core concept; meanwhile, a person of ordinary skill in the art, according to the concept of the present disclosure, may make a change of the detailed implementation and application scope. Thus, the description herein should not be understood as a limitation to the present disclosure.

What is claimed:

1. A method comprising:
   generating a service querying request, the service querying request including a querying condition;
   acquiring a first server address list of a target service corresponding to the querying condition;
   presetting a failure database, the failure database storing an association relationship between one or more failed server addresses and corresponding statistical numbers of failure times, the corresponding statistical numbers of failure times being based on types of failure and used to make statistics on a number of failure times of the one or more failed server addresses within a preset time period;
   acquiring a failed server address list of a preset number of failed server addresses selected from the one or more failed addresses that have top rankings based on respective statistical numbers of failure times of the one or more failed addresses, the preset number representing a maximum number of failed servers to be isolated, the maximum number based on a demand associated with the querying condition and being less than or equal to an actual number of failed servers;
   deleting the failed server address list from the first server address list to obtain a second server address list;
   selecting a target server address from the second server address list; and
   initiating an invocation of the target service to the target server address.

2. The method of claim 1, wherein the deleting the failed server address list from the first server address list to obtain a second server address list includes:
   deleting one or more server addresses in the failed server address list from the first server address list and
   using one or more remaining server addresses in the first server address list for the second server address list.

3. The method of claim 1, wherein the acquiring the failed server address list includes acquiring the one or more failed server addresses matching addresses in the first server address list from the failure database.

4. The method of claim 3, wherein the acquiring the failed server address list further includes:
   determining that more than one failed server address is matched with the first server address list;
   and
   organizing the preset number of failed server addresses that have the top rankings in the sorting into the failed server address list.

5. The method of claim 1, further comprising:
   determining that there is a failure of invocation of the target service;
   determining the target server address as a failed server address;
   determining whether the failed server address exists in the failure database; and
   upon determining that the failed server address exists in the failure database, increasing a statistical number of failure times corresponding to the failed server address by a preset threshold.

6. The method of claim 5, further comprising:
   upon determining that the failed server address does not exist in the failure database:
   adding the failed server address into the failure database,
   setting a corresponding statistical number of failure times at a preset initial value, and
   updating the failed server address list.

7. The method of claim 6, wherein the failure of the invocation of the target service includes at least one of the following:
   a response timeout; and
   a busy degree of target server thread pool is beyond a preset threshold.

8. The method of claim 1, further comprising:
   respectively setting a timer for each of the failed server addresses in the failure database; and
   when the timer expires, resetting the statistical number of failure times corresponding to the corresponding failed server address to zero.

9. The method of claim 1, wherein the acquiring the failed server address list includes:

generating a failure information acquiring request, the failure information acquiring request acquiring information of a server that has ever been failed in a cluster within the preset time period;

sending the failure information acquiring request to a remote server, the remote server storing a record of address information of the failed server; and receiving the failed server address list returned by the remote server with respect to the failure information acquiring request.

10. The method of claim 1, wherein the selecting the target server address from the second server address list includes randomly selecting the target server address from the second server address list.

11. An apparatus comprising:

one or more processors; and memory communicatively coupled to the one or more processors, the memory storing a plurality of modules including:

a request generating module that generates a service querying request, the service querying request including a querying condition;

a first address acquiring module that acquires a first server address list of a target service corresponding to the querying condition;

a database presetting module that presets a failure database, the failure database storing an association relationship between one or more failed server addresses and corresponding statistical numbers of failure times, the corresponding statistical numbers of failure times being based on types of failure and used to make statistics on a number of failure times of the one or more failed server addresses within a preset time period;

a failure address acquiring module that acquires a failed server address list of a preset number of failed server addresses selected from the one or more failed addresses that have top rankings based on respective statistical numbers of failure times of the one or more failed addresses, the preset number representing a maximum number of failed servers to be isolated, the maximum number based on a demand associated with the querying condition and being less than or equal to an actual number of failed servers;

a second address acquiring module that deletes the failed server address list from the first server address list to obtain a second server address list;

an address selecting module that selects a target server address from the second server address list; and a service invoking module that initiates an invocation of the target service to the target server address.

12. The apparatus of claim 11, wherein the second address acquiring module further:

deletes one or more server addresses in the failed server address list from the first server address list and uses one or more remaining server addresses in the first server address list for the second server address list.

13. The apparatus of claim 11, wherein the failure address acquiring module includes:

an address matching sub-module that acquires the failed server address list includes acquiring the one or more failed server addresses matching addresses in the first server address list from the failure database.

14. The apparatus of claim 13, wherein the failure address acquiring module further includes:

an address sorting sub-module that determines that more than one failed server address is matched with the first server address list; and a list organizing sub-module that organizes the preset number of failed server addresses that have the top rankings in the sorting into the failed server address list.

15. The apparatus of claim 11, wherein the plurality of modules further includes:

a determining module that determines that there is a failure of invocation of the target service and determines the target server address as a failed server address;

a judging module that determines that the failed server address exists in the failure database; and a first calculating module that increases a statistical number of failure times corresponding to the failed server address by a preset threshold.

16. The apparatus of claim 11, wherein the plurality of modules further includes:

a determining module that determines that there is a failure of the invocation of the target service and determines the target server address as a failed server address;

a judging module that determines that the failed server address does not exist in the failure database;

a second calculating module that adds the failed server address into the failure database and sets a corresponding statistical number of failure times at a preset initial value; and a list updating module that updates the failed server address list.

17. The apparatus of claim 11, wherein the failure address acquiring module includes:

a failure request generating sub-module that generates a failure information acquiring request, the failure information acquiring request acquiring information of a server that has ever been failed in a cluster within the preset time period;

a failure request sending sub-module that sends the failure information acquiring request to a remote server, the remote server storing a record of address information of the failed server; and a failure information receiving module that receives the failed server address list returned by the remote server with respect to the failure information acquiring request.

18. One or more memories having stored thereon computer-executable instructions that are executable by one or more processors to perform operations comprising:

generating a service querying request, the service querying request including a querying condition;

acquiring a first server address list of a target service corresponding to the querying condition;

presetting a failure database, the failure database storing an association relationship between one or more failed server addresses and corresponding statistical numbers of failure times, the corresponding statistical numbers of failure times being based on types of failure and used to make statistics on a number of failure times of the one or more failed server addresses within a preset time period;

acquiring a failed server address list of a preset number of failed server addresses selected from the one or more failed addresses that have top rankings based on respective statistical numbers of failure times of the one or more failed addresses, the preset number representing a maximum number of failed servers to be isolated, the maximum number based on a demand associated with the querying condition and being less than or equal to an actual number of failed servers;

deleting the failed server address list from the first server address list to obtain a second server address list;

selecting a target server address from the second server address list; and initiating an invocation of the target service to the target server address.

19. The one or more memories of claim 18, wherein the operations further comprise:

deleting one or more server addresses in the failed server address list from the first server address list and using one or more remaining server addresses in the first server address list for the second server address list.

20. The one or more memories of claim 18, wherein the operation of acquiring the failed server address list further comprises:

acquiring the one or more failed server addresses matching addresses in the first server address list from the failure database;

determining that more than one failed server address is matched with the first server address list; and organizing the preset number of failed server addresses that have the top rankings in the sorting into the failed server address list.

\* \* \* \* \*